Sept. 27, 1938.                 C. E. GRAY ET AL                    2,131,510
         APPARATUS FOR THE CONTINUOUS MANUFACTURE OF FROZEN FOOD PRODUCTS
                     Filed June 27, 1923          2 Sheets-Sheet 2
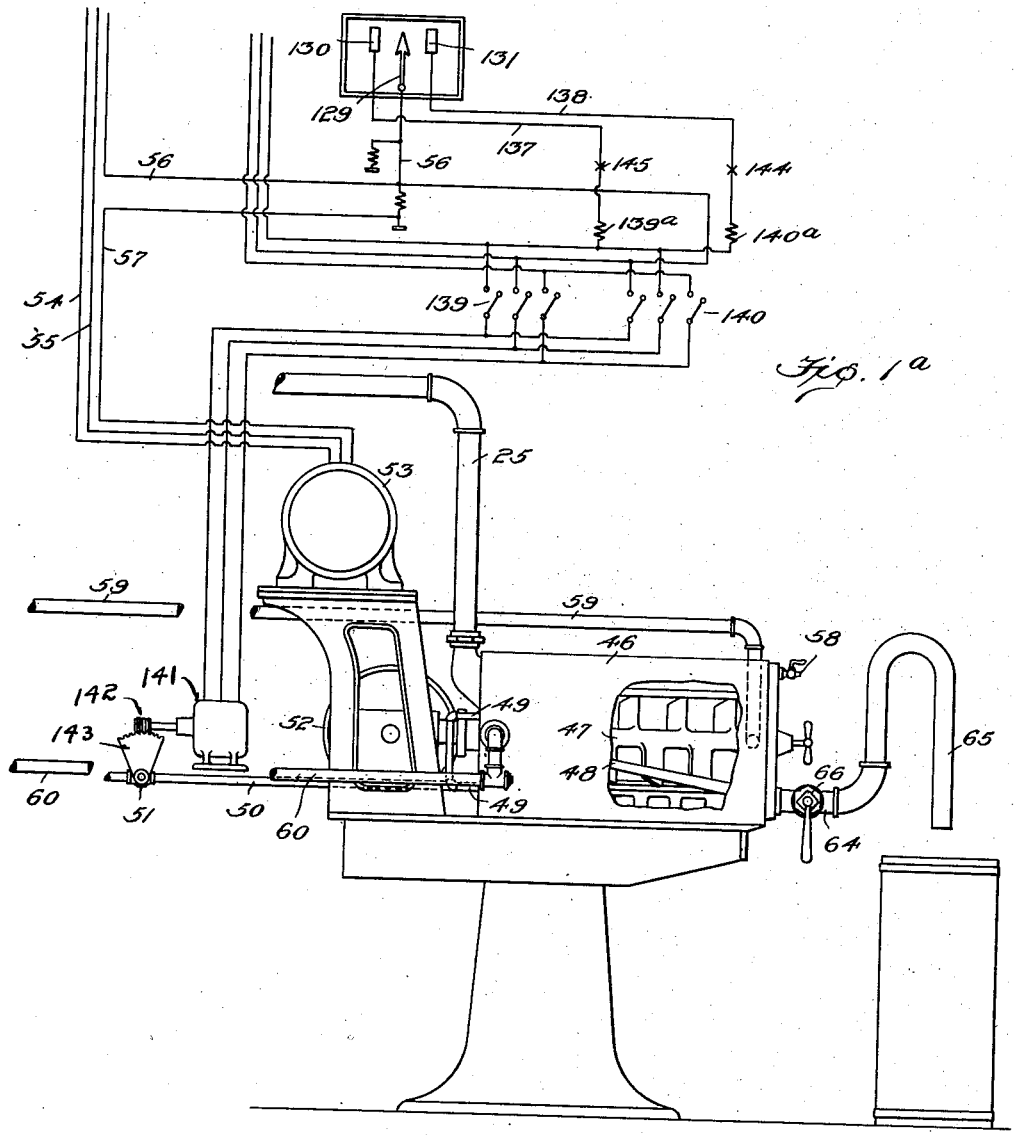
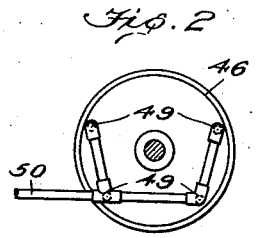

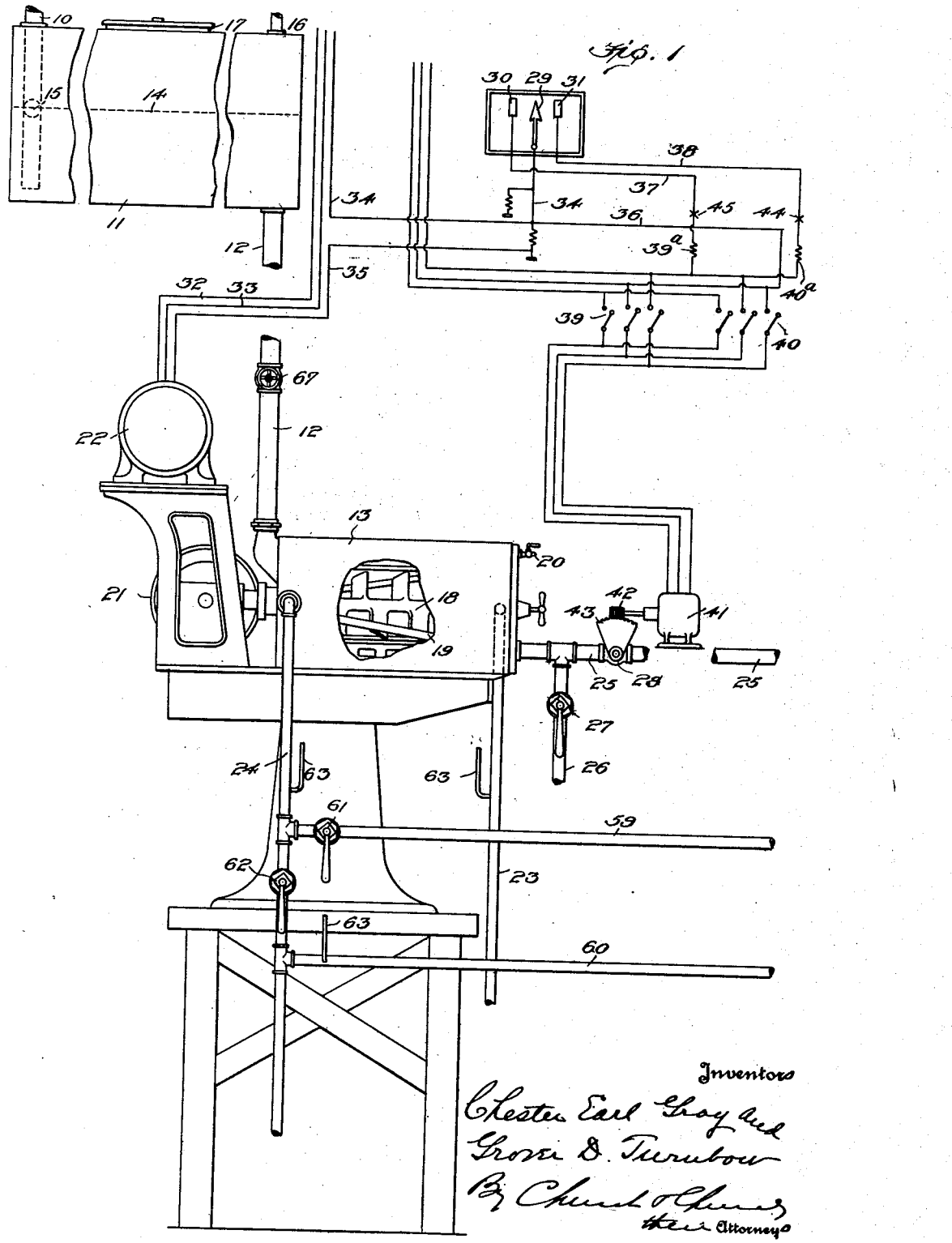

Patented Sept. 27, 1938

2,131,510

UNITED STATES PATENT OFFICE 2,131,510

APPARATUS FOR THE CONTINUOUS MANUFACTURE OF FROZEN FOOD PRODUCTS

Chester Earl Gray and Grover D. Turnbow, Oakland, Calif.

Application June 27, 1928, Serial No. 288,787

10 Claims. (Cl. 62—114)

This invention relates to an improved apparatus for the manufacture of frozen food products such as ice cream, ices, sherbets, and the like, which are produced from frozen liquids or semi-liquids, with which there is incorporated, as a normal constituent, a substantial quantity of air or other gas.

In the past, efforts have been put forth to provide an apparatus for continuously freezing such frozen food products, but due to the fact that the volume of air or gaseous content incorporated in the finished product could not be successfully or properly regulated, such prior efforts are believed to have been substantially unsuccessful. As a consequence, apparatus now commonly used in the industry to which this invention relates is of a type capable of handling successive batches of materials or, as might be said, capable of operating only intermittently upon individual batches of material that are successively placed therein. In these forms of apparatus for successively treating individual batches of materials both the freezing and whipping operations are always performed in the presence of an excessive volume of air and in all cases considerable skill and care must be exercised constantly to incorporate the desired percentage of air or gas in the final frozen product and to retain the same therein while it is being discharged from the freezing and whipping apparatus.

Accordingly, the present invention seeks to provide apparatus for treating or freezing a continuous supply of the ingredients constituting frozen food products, such as mentioned, this freezing taking place in a receptacle substantially free from air and from which the frozen materials are discharged to a second receptacle at which point air or other gas is incorporated in the frozen materials until the gas content thereof is brought up to the desired percentage. The discharge of the frozen or semi-frozen constituents to the gas incorporating receptacle is controlled, preferably automatically, by means responsive to the condition of the constituents in the freezing receptacle. That is, means responsive to the density of the constituents being frozen are provided for the discharge of the semi-frozen materials from the freezing receptacle. In incorporating the air or gas in the semi-frozen materials, it is essential that such gas be uniformly distributed in the finished product so that the present invention also contemplates agitating means for effecting such uniform distribution of the gas and in connection with such agitating means control devices responsive to the density of the materials in the gas incorporating receptacles are also provided for regulating the quantity of air or gas supplied to that receptacle.

With these and other objects in view the present invention consists in certain novel details of construction and combinations and arrangements of parts all as will hereinafter be more fully described and the novel features thereof particularly pointed out in the appended claims.

In the accompanying drawings,

Figure 1 and Fig. 1a, jointly, constitute a more or less diagrammatical illustration of apparatus arranged in accordance with the present invention; and Fig. 2 is a detail end view of the whipping or gas incorporating receptacle, this figure illustrating the air inlet connections for said chamber.

In the form of apparatus shown in the accompanying drawings the constituents or ingredients of the ice cream or other product to be prepared, excepting the gas that is to be incorporated therein, are continuously supplied to the freezing chamber and after the initial portion of such materials have been frozen to bring the density of the mix to a predetermined point, the valve in the discharge pipe of the freezing chamber is opened and the frozen or semi-frozen mixture delivered to an agitating chamber where air or other gas is supplied to the mixture and incorporated therein. This latter chamber is supplied with a regulated quantity of air depending upon the percentage of air or gas which it is desired to have incorporated in the final product.

This incorporation of air or other gas in the mixture reduces its density and after the density thereof has been reduced to a desired point, a valve in the discharge pipe from said whipping or agitating chamber is opened and aerated frozen material discharged therefrom. Means are provided for registering or indicating the density of materials present in both the freezing and whipping chambers and while the discharge of the frozen materials from the freezing chamber and the admission of gas to the gas incorporating receptacle may be controlled manually by an attendant who constantly has such indicating devices under observation, nevertheless, it is preferred that the discharge of the frozen material from the freezing chamber and the admission of gas to the incorporating chamber be controlled by motor operated valves whose motors are automatically controlled by means connected to said indicating and registering devices. In other words, the motors for said valves are to be controlled in their operations by means responsive to the density of the materials in the freezing chamber and the gas incorporating chamber.

Referring to the drawings, the constituents of the product to be produced, except the air or gas, are fed through a supply pipe 10 extending to a point in proximity to the bottom of a feed tank 11 and thence through a discharge pipe 12 extending from said tank to a freezing chamber 13. The mix is maintained at a constant level (indicated at 14) in said feed tank by means of a float controlled valve 15 in supply pipe 10.

The mix may be fed in any suitable way, but preferably tank 11 is provided with an air inlet 16 through which a regulated quantity of air is admitted to maintain a proper pressure on the mix within said tank. Tank 11 is also provided with a man-hole 17.

Freezing chamber 13 may be of any desired type. In the present instance, it is illustrated more or less diagrammatically, but a portion of its walls are broken away to show beater blades 18 and a portion of scrapers 19 of ordinary construction. Preparatory to operating the apparatus, air may be exhausted from chamber 13 through an air-cock 20. The beater blades 18 and the scrapers 19 are actuated through gearing indicated at 21, the said gearing being driven by a multi-phase motor 22 to which current is supplied as will hereinafter be more fully described in connection with another feature of the present apparatus. Chamber 13 is jacketed for the circulation of a freezing medium, such as brine, around the same, such freezing medium being supplied through an inlet pipe 23 and discharged from said jacket through an outlet pipe 24. Leading from chamber 13 is a discharge pipe 25 provided with sampling outlet 26 controlled by a manually operated valve 27. A second valve 28 is also interposed in discharge pipe 25 for controlling the discharge of frozen material from freezing chamber 13 and while said valve 28 may be operated manually, preferably it is automatically controlled in its movements by means responsive to the density of the materials being frozen in chamber 13.

Automatic control of valve 28 is accomplished by devices including apparatus such as disclosed in United States Patent No. 1,449,458. These devices comprise an indicator 29 which is adapted to establish one or the other of two circuits by means of what might be termed minimum contact member 30 and a maximum contact member 31, either of which may be engaged by said indicator 29, depending upon the load that is imposed on the motor to which the indicator is connected. The construction of this mechanism is fully illustrated and described in the patent above mentioned, and, consequently, the circuit arrangements only have been diagrammatically illustrated in the present instance. As illustrated, two of the main feed wires 32, 33, for motor 22 lead directly to said motor, while the third wire 34 leads to the indicator 29 and thence to motor 22 through wire 35. Extending from line 34 is a line 36, which, together with lines 37, 38 from contact members 30, 31, respectively, are connected through magnetic switches 39, 40, to a motor 41 adapted to drive a worm 42 meshing with a segmental gear member 43 mounted on the valve stem of valve 28. The magnetic switches 39 and 40 are opened and closed through their solenoids 39a and 40a, respectively, one of these solenoids being energized by the closing of one or the other of the circuits through contact members 29, 30 and 31. Said solenoids are de-energized by means of limit switches 44, 45, in lines 38, 37, respectively, said limit switches being adapted to break the circuit in their respective lines after a predetermined number of revolutions of the shaft of motor 41, depending upon the number of revolutions required to open or close valve 28.

When the mix is first introduced into freezing chamber 13 the density thereof is, of course, at its minimum point and, accordingly, indicator contact 29 will engage contact member 30 due to the comparatively small amount of current required for the operation of motor 32 in agitating the mix while being frozen in said chamber. This engagement of contacts 29 and 30 closes the circuit through line 37 whereupon solenoid 39a will effect a closing of magnetic switch 39 thus rendering motor 41 operative for the purpose of actuating valve 28 and closing the same to prevent discharge of the mix from chamber 13. This circuit for motor 41 is maintained only long enough to effect the closing of valve 28 due to the provision of limit switch 45 in the circuit first mentioned, this limit switch having been adjusted to break the circuit after the motor has made the number of revolutions required to close the valve 28. Under these conditions, the mix in chamber 13 is gradually frozen and after its density has been increased to the desired degree the valve 28 will be automatically opened. This is accomplished by having the maximum contact 31 so adjusted that when the density of the materials in chamber 13 has reached the desired stage the current required for operation of the motor 41 will be such as to cause indicator member 29 to engage maximum contact member 31, thereby establishing the circuit through line 38. As a result, solenoid 40a of magnetic switch 40 is energized and said switch closed so as to again operate motor 41 but in a direction reverse to that in which it was previously operated by the closing of magnetic switch 39.

This effects a reverse manipulation or opening of valve 28, whereupon, the partially frozen materials will be discharged from chamber 13. After valve 28 has been opened by the reverse operation of motor 41 the circuit for accomplishing this result will be broken by limit switch 44 which, like limit switch 45, is adjusted to function after motor 41 has made the number of revolutions necessary to open valve 28.

After valve 28 has been opened the partially frozen materials are fed through pipe 25 to a whipping chamber or receptacle 46. This receptacle is illustrated more or less diagrammatically, but a portion of its wall is broken away to show a portion of the blades 47 and the scrapers 48. Receptacle 46 has a series of air inlets 49 all of which communicate with an air supply pipe 50 and in said pipe there is a valve 51 that may be manually controlled but which is preferably controlled automatically by means responsive to the density of the materials which are having air incorporated therein in the chamber 46. In other words, the shaft of beater blades 47 is connected to gearing indicated at 52 adapted to be driven by motor 53 to which current is supplied from a suitable source. This motor 53 is similar to motor 22 and two of its feed lines 54, 55, lead directly thereto, while the third feed line 56 goes to or through an indicator contact member 129, returning from this regulated device to the motor by means of line 57. The stem of valve 51 carries a segmental gear 143 in mesh with a worm 142 on the shaft of a motor 141. This motor is adapted to be connected to the source of current from motor 53 through movable contact member 129 by mechanism such as described in connection with motors 41 and 22. The operation of motor 141, however, is exactly the reverse of that of motor 41.

This is due to the fact that as the partially frozen mixture enters whipping chamber 46 its density is at a maximum so that it is necessary to supply air to said chamber, in which event, valve 51 should be opened, but after the desired quantity of air has been incorporated in the mixture in chamber 46 its density is lowered so that valve 51 should then be closed to prevent an excessive supply of air to said chamber.

Accordingly, when indicator member 129 engages the maximum contact member 131 of this second control instrument, the circuit is established through line 138 for energizing solenoid 140a and closing magnetic switch 140. Motor 141 is then operated and valve 51 opened thereby, thus permitting air to be supplied to said whipping chamber. Motor 141 is rendered inoperative by the usual limit switch 144 in line 138. After the desired percentage of air, or of the gas, has been incorporated or whipped into the partially frozen mix so that the density of such mix is reduced to the desired degree indicator contact member 129 moves into engagement with minimum contact member 130, closing the circuit to a motor 141 through line 137, solenoid 139a and magnetic switch 139. The closing of this circuit results in the operation of motor 141 in a reverse direction, thus closing valve 51 and preventing the further supply of air to whipping chamber 46. After valve 51 has been closed motor 141 is rendered inoperative by limit switch 145. It will be appreciated that all that is necessary in connection with this automatic control to the extent to which the mixture is frozen in chamber 13 is to take samples thereof from sampling outlet 26 and observe the position of indicator contact element 29, when it is noted, by means of such samples, that the mixture has been frozen and its density increased to the desired extent.

The proper relative positions of contact members 30, 31, can thus be determined so that valve 28 will always be closed when the density of material in chamber 13 is below a certain point and will not be opened by the devices described until the density of said mix has been decreased to the proper extent. These observations would, of course, be made when the apparatus is first placed in operation, and proper settings of contact members 30, 31, would be made at that time. Likewise, in the case of the automatic control for regulating the supply of air to whipping chamber 46, observations will be made as to the reduction in density that is taking place in the materials initially discharged from said chamber so that the proper relative positions of contact members 130, 131, can be determined.

Whipping chamber 46 is provided with an aircock 58 through which air may be exhausted from said chamber when the apparatus is first made ready preparatory to being placed in operation. Said chamber is also jacketed for the circulation of a refrigerating medium around the same, but as the temperature to be maintained in this chamber is usually lower than that which is necessary to maintain in chamber 13, the refrigerating medium passed through the jacket of chamber 46 may be supplied through a pipe 59 connected to brine discharge pipe 24 of freezing chamber 13. A return pipe 60 connected to the jacket of chamber 46 and to the said discharge pipe 24 of freezing chamber 13 results in the brine flowing from pipe 24 through pipe 59 to the jacketed chamber 46 and back to said discharge pipe 24 through pipe 60.

The flow of the refrigerating medium through these pipes and the jacketed chamber 46 is controlled by a valve 61 in pipe 59 and a valve 62 in pipe 24 intermediate the points at which pipes 59 and 60 are connected to said pipe 24. With this arrangement the proper adjustment of valve 62 will effect a by-passing of the necessary quantity of freezing medium through pipe 59 to the jacketed chamber 46 and back through pipe 60. The temperature of the refrigerating medium passing through these various pipes may be observed at all times by the provision of thermostats 63 in pipes 23, 24 and 60.

The mixture, after whipping in chamber 46, is discharged therefrom through discharge pipe 64 which is provided with a goose-neck terminal 65 and a control valve 66. Valve 66 is, of course, closed when operations are first begun, not being opened permanently until the mixture flowing through the apparatus has been whipped and had incorporated therein a predetermined quantity or percentage of air or other gas. However, prior to this time, valve 66 may be opened and closed periodically for the purpose of observing the extent of aeration of the mixture so that the proper relative positioning of contact member 130 of the automatic control mechanism for air supply valve 51 can be determined. A valve 67 is also provided in supply pipe 12 in order to cut off the supply of the mix to freezing chamber 13 whenever desired.

As before outlined, the present apparatus renders possible a continuous treatment of materials constituting frozen food products which contain amongst other ingredients a gaseous or air content, this continuous treatment consisting in first freezing all of the constituents other than the gas or air in the absence of such gas or in the presence of a volume of gas less than that desired in the finished product until they attain a desired predetermined density, this freezing of said constituents being automatically controlled after which the partially frozen constituents are fed continuously, or substantially so, to a whipping chamber where an automatically controlled quantity of air is brought into contact therewith so that said constituents will have incorporated therein a desired percentage of air or other gas after which the finished product is continuously discharged from the whipping chamber.

It will be appreciated that variations may be made in the present apparatus. For instance, while it is preferable that the discharge of the frozen mixture in freezing chamber 13 and the supply of air to the whipping chamber 46 may be controlled automatically by means responsive to the densities of the materials in said chambers, nevertheless, valves 28 and 51, may be operated manually by attendants who would constantly observe the indicators of said regulating devices and open and close said valves if, and when, the indicators of said devices assume positions corresponding to the maximum and minimum densities of the materials being treated.

Where it is desired to preserve; milk, cream or other materials, such as fruit juices having water, mineral salts and colloids therein, for subsequent use, the material may be frozen in chamber 13 as before described and stored in suitable containers without having air incorporated therein in the air incorporating chamber.

What we claim is:

1. In an apparatus for manufacturing frozen food products having a gaseous content, the combination of a pair of receptacles, means for continuously partially freezing in one of said receptacles an uninterrupted supply of the constituents of said product other than the gas in the presence of a volume of such gas less than that desired in the finished product, means for continuously incorporating the desired volume of gas in the product in the other receptacle after said other constituents are partially frozen and means for delivering the partially frozen materials from the first receptacle to said other receptacle.

2. In an apparatus for manufacturing frozen food products having a gaseous content, the combination of means for continuously partially freezing an uninterrupted supply of the constituents of said product other than the gas in the absence of such gas, means for continuously incorporating the desired volume of gas in the product after said other constituents are partially frozen, and means controlled by the density of the gasified constituents for regulating the quantity of gas supplied to the partially frozen constituents.

3. In an apparatus for manufacturing frozen food products containing air, a receptacle to which the constituents other than air are constantly supplied, means for partially freezing said constituents in said receptacle, means controlled by the density of the constituents in said receptacle for regulating the discharge thereof from the receptacle, means for subsequently incorporating the desired percentage of air in the partially frozen constituents and means for conveying the partially frozen constituents from said receptacle to said air incorporating means.

4. In an apparatus for manufacturing frozen food products containing air, a receptacle to which the constituents other than air are constantly supplied, means for partially freezing said constituents in said receptacle, means controlled by the density of the constituents in said receptacle for regulating the discharge thereof from the receptacle, means for subsequently incorporating the desired percentage of air in the partially frozen constituents, and means controlled by the density of the constituents after air has been incorporated therein for regulating the supply of gas to said other constituents in the second receptacle.

5. In an apparatus for manufacturing frozen food products containing air, the combination of a receptacle to which the constituents other than air are continuously supplied, means for partially freezing the constituents supplied to said receptacle, means for automatically controlling the extent to which said constituents are frozen, means for continuously incorporating the desired volume of air in said constituents after they have been frozen, and means for automatically regulating the quantity of air supplied to the partially frozen constituents for incorporation therein.

6. In an apparatus for manufacturing frozen food products containing air, the combination of a receptacle to which the constituents other than air are constantly supplied, means for continuously partially freezing the constituents in said receptacle, means for controlling the extent to which said constituents are frozen, a receptacle to which the partially frozen constituents are delivered, means for supplying air to said second receptacle, and means for continuously incorporating air in said frozen constituents in the second receptacle.

7. In an apparatus for manufacturing frozen food products containing air, the combination of a receptacle to which the constituents other than air are constantly supplied, means for continuously partially freezing the constituents in said receptacle, means for controlling the extent to which said constituents are frozen, a receptacle to which the partially frozen constituents are delivered, means for supplying air to said second receptacle, means for regulating the quantity of air supplied to the second receptacle, and means for continuously incorporating air in said frozen constituents in said second receptacle.

8. In an apparatus for manufacturing frozen food products having a gaseous content, such as air, means for partially freezing all the constituents other than air before the air is incorporated therein and means for automatically controlling the supply of air to said frozen mass when the air is subsequently incorporated therein.

9. In an apparatus for manufacturing frozen food products containing air, the combination of a receptacle to which the constituents other than air are continuously supplied, means for partially freezing the constituents supplied to said receptacle, means for automatically controlling the extent to which said constituents are frozen, a second receptacle, means for delivering the partially frozen constituents from the first receptacle to said second receptacle, and means for continuously incorporating the desired volume of air in said constituents in said second receptacle after they have been frozen.

10. In an apparatus for manufacturing frozen food products containing a predetermined percentage of a gas such as air and constituents other than said gas, the combination of a processing chamber, means for supplying said other constituents to said processing chamber, means for supplying said gas to said other constituents, means for regulating the supply of gas, whipping mechanism in said chamber for incorporating the gas in said other constituents, and means for maintaining a uniform pressure within said processing chamber, said pressure being greater than atmospheric.

CHESTER EARL GRAY.
GROVER D. TURNBOW.